United States Patent
Roske et al.

(10) Patent No.: US 10,821,822 B2
(45) Date of Patent: Nov. 3, 2020

(54) VEHICLE TRANSMISSION AND HYBRID DRIVETRAIN

(71) Applicant: ZF Friedrichshafen AG, Friedrichshafen (DE)

(72) Inventors: Michael Roske, Friedrichshafen (DE); Raffael Kuberczyk, Ravensburg (DE); Juri Pawlakowitsch, Kressbronn (DE); Bernd Unseld, Ravensburg (DE); Thomas Rosemeier, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 212 days.

(21) Appl. No.: 15/678,331

(22) Filed: Aug. 16, 2017

(65) Prior Publication Data
US 2018/0050584 A1 Feb. 22, 2018

(30) Foreign Application Priority Data
Aug. 19, 2016 (DE) .......................... 10 2016 215 562

(51) Int. Cl.
*B60K 6/48* (2007.10)
*B60K 1/00* (2006.01)
(Continued)

(52) U.S. Cl.
CPC .................. *B60K 6/48* (2013.01); *B60K 1/00* (2013.01); *B60K 6/365* (2013.01); *B60K 6/40* (2013.01);
(Continued)

(58) Field of Classification Search
CPC ........ B60K 6/48; B60K 17/046; B60K 17/08; B60K 17/165; B60K 1/00; B60K 6/40;
(Continued)

(56) References Cited

U.S. PATENT DOCUMENTS

| 4,938,097 A | * | 7/1990 | Pierce | .................... | B60K 17/06 |
| | | | | | 475/206 |
| 6,176,808 B1 | * | 1/2001 | Brown | .................... | B60K 6/365 |
| | | | | | 477/5 |

(Continued)

FOREIGN PATENT DOCUMENTS

| DE | 102005035719 A1 | 3/2006 |
| JP | 2014084000 A | 5/2014 |

OTHER PUBLICATIONS

German Search Report DE102016215562.8, dated Apr. 13, 2017. (10 pages).

*Primary Examiner* — Jeffrey A Shapiro (74) *Attorney, Agent, or Firm* — Dority & Manning, P.A.

(57) ABSTRACT

A motor vehicle transmission including an interface to a drive unit, a drive shaft, an output shaft coaxial to the drive shaft, a differential transmission paraxial to the drive shaft, a device for forming gear ratios between the drive and output shafts, and an electric motor with a fixed stator and a rotatable rotor. The output shaft is connected with the differential transmission by a chain drive and a downstream gear set coaxial to the differential transmission. The electric motor is at an axial end of the transmission where the interface to the drive unit is formed. The rotor is connected with the drive shaft. The chain drive is axially between the differential transmission and the downstream gear set or the downstream gear set is axially between the chain drive and the differential transmission, and the chain drive is axially between the electric motor and the downstream gear set.

16 Claims, 7 Drawing Sheets

(51) Int. Cl.
*F16H 3/66* (2006.01)
*B60K 17/16* (2006.01)
*B60K 17/04* (2006.01)
*B60K 17/08* (2006.01)
*B60K 6/365* (2007.10)
*B60K 6/40* (2007.10)
*F16H 3/72* (2006.01)
*F16H 37/08* (2006.01)
*F16H 3/44* (2006.01)

(52) U.S. Cl.
CPC ............ *B60K 17/046* (2013.01); *B60K 17/08* (2013.01); *B60K 17/165* (2013.01); *F16H 3/666* (2013.01); *F16H 3/725* (2013.01); *F16H 37/0806* (2013.01); *B60K 2001/001* (2013.01); *B60K 2006/4825* (2013.01); *F16H 2003/442* (2013.01); *F16H 2200/0052* (2013.01); *F16H 2200/201* (2013.01); *F16H 2200/2005* (2013.01); *F16H 2200/2043* (2013.01); *F16H 2200/2097* (2013.01)

(58) Field of Classification Search
CPC .............. B60K 6/365; B60K 2001/001; B60K 17/346; B60K 2006/4825; B60K 6/50; B60K 6/547; F16H 3/666; F16H 3/725; F16H 37/08; F16H 37/082; F16H 37/0826; F16H 37/0833; F16H 37/0806; F16H 37/0846; F16H 2037/0866; F16H 2037/0873; F16H 2003/442; F16H 2200/2043; F16H 2200/2005; F16H 2200/0052; F16H 2200/2097; F16H 2200/201

See application file for complete search history.

(56) References Cited

U.S. PATENT DOCUMENTS

| | | | |
|---|---|---|---|
| 6,217,479 B1* | 4/2001 | Brown | F16H 3/66 475/207 |
| 6,585,066 B1* | 7/2003 | Koneda | B60K 6/365 180/165 |
| 7,261,660 B2 | 8/2007 | Sowul et al. | |
| 2002/0177504 A1* | 11/2002 | Pels | B60K 6/36 477/3 |
| 2006/0025265 A1* | 2/2006 | Sowul | B60K 6/365 475/5 |
| 2006/0046886 A1* | 3/2006 | Holmes | B60K 6/365 475/5 |
| 2006/0100060 A1* | 5/2006 | Kraska | B60K 6/405 477/156 |
| 2011/0042155 A1* | 2/2011 | Tarasinski | B60L 50/16 180/65.6 |
| 2013/0190124 A1* | 7/2013 | Gassmann | B60K 1/00 475/150 |
| 2014/0007740 A1* | 1/2014 | Takahashi | B60K 6/445 74/665 A |
| 2014/0163748 A1* | 6/2014 | Miyata | F04B 49/02 700/282 |
| 2015/0367851 A1* | 12/2015 | Yoshizawa | B60K 6/445 701/48 |
| 2018/0051788 A1* | 2/2018 | Gassmann | F16H 48/40 |

* cited by examiner

|   | A | B | C | D | E |
|---|---|---|---|---|---|
| 1 | X |   |   | X |   |
| 2 | X |   | X |   |   |
| 3 | X | X |   |   |   |
| 4 | X |   |   |   | X |
| 5 |   | X |   |   | X |
| 6 |   |   | X |   | X |
| R1 |   | X | X | X |   |

Fig. 6

VEHICLE TRANSMISSION AND HYBRID DRIVETRAIN

FIELD OF THE INVENTION

The invention relates generally to a transmission for a motor vehicle and a drive train for a motor vehicle with such a transmission. In this context a transmission denotes, in particular, a multi-speed transmission, in which a plurality of gears, i.e., fixed gear ratios between the drive shaft and the output shaft of the transmission, can be shifted, preferably automatically, by shift elements, for example, clutches or brakes. Such transmissions are used primarily in motor vehicles to adjust the rotational speed and the torque output characteristic of the drive unit to the driving resistance of the vehicle in a suitable manner.

BACKGROUND

The U.S. Pat. No. 6,585,066 B1 describes a hybrid drive train for an automotive vehicle comprising an internal combustion engine and an automatic transmission. The hybrid drive train is provided for use in a front transverse or rear transverse drive train. A starter generator is arranged between the internal combustion engine and an input shaft of the automatic transmission. An output shaft of the automatic transmission is connected to a differential transmission by a chain drive and a gear set.

In a front transverse or rear transverse drive train, it is important to ensure a very short axial design length of the drive train, so that the unit consisting of internal combustion engine and transmission can be arranged inside the vehicle structure. Shown in the aforementioned patent specification, the provision of an electric motor significantly increases the axial design length of the drive train.

SUMMARY OF THE INVENTION

The object of the present invention is to provide a transmission together with an electric motor, wherein the transmission is distinguished by a shorter axial design length.

Accordingly, a transmission includes an interface to a transmission-external drive unit, for example, an internal combustion engine, a drive shaft, an output shaft arranged coaxially to the drive shaft, a differential transmission arranged paraxially to the drive shaft, a device for forming various gear ratios between the drive shaft and the output shaft, and an electric motor with a rotationally fixed stator and a rotatable rotor is provided.

The output shaft is in constant operative connection with the differential transmission by a chain drive and a downstream gear set that is arranged coaxially to the differential transmission. In other words, the speed ratio between the output shaft and the differential transmission is determined by the gear ratio of the chain drive and by the gear ratio of the downstream gear set.

The electric motor is disposed at an axial end of the transmission at which the interface to the transmission-external drive unit is formed. The interface to the transmission-external drive is designed to transmit rotational movement from the transmission-external drive unit to the drive shaft of the transmission and can be, for example, a flange or a plug-in gearing. The interface is formable on the drive shaft or on a connecting shaft that is connectable to the drive shaft. In this permanent or shiftable connection between the transmission-external drive unit and the drive shaft, it is possible to arrange one or more torsional vibration dampers.

The rotor is in constant operative connection with the drive shaft. This permanent connection may be a direct connection or an indirect connection. In a direct attachment of the rotor to the drive shaft, the electric motor is connected directly to the drive shaft in a rotationally fixed manner. In an indirect connection the rotor is attached to the drive shaft by a fixed gear ratio, for example, by a flexible drive, by at least one spur gear set, or by an additional planetary gear set. One example of a flexible drive is a chain drive.

According to the invention, the chain drive is arranged axially between the differential transmission and the downstream gear set. As an alternative, the downstream gear set is arranged axially between the chain drive and the differential transmission; and the chain drive is arranged axially between the electric motor and the downstream gear set. Owing to the axial assembly according to the invention, the electric motor can be arranged either closer to the gear forming section of the transmission or can have a larger diameter. As a result, the entire axial assembly of the transmission is shorter.

If the chain drive is arranged axially between the differential transmission and the downstream gear set, then the differential transmission is arranged preferably at the axial end of the transmission at which the interface to the transmission-external drive unit is formed. In this way the side shafts between the differential transmission and the driving gears of the motor vehicle may be as long as possible. Such a design reduces the flexion angle of the side shaft joints and, thus, their load during operation.

If the chain drive is arranged axially between the differential transmission and the downstream gear set, then the downstream gear set can be arranged, according to an alternative embodiment, axially between the electric motor and the chain drive. In other words, the differential transmission is now no longer arranged at the axial end of the transmission at which the interface to the transmission-external drive unit is arranged, but rather is axially offset therefrom in the direction behind the chain drive. Such a configuration makes it possible to enlarge the diameter of the electric motor, for example, as a disk rotor. As a result, the axial width of the electric motor is reduced.

The downstream gear set is preferably a negative or minus gear set having a ring gear that is permanently fixed in a rotationally fixed manner, having a sun gear that is permanently connected to a chain gear of the chain drive, which is arranged coaxially to the differential transmission, and having a planet carrier that is permanently connected to the differential transmission, for example, with its cage.

The device for forming the various gear ratios between the drive shaft and the output shaft may be designed in a number of ways. The device may be a layshaft transmission, in which at least two shafts arranged paraxially to each other comprise a plurality of fixed gears and a plurality of loose gears, which can be shifted to the respective shaft by shift elements. Likewise, the device may comprise a plurality of planetary gear sets as well as a plurality of shift elements in order to selectively connect or selectively fix the elements of the planetary gear sets. Individual shift elements or all of the shift elements may be frictional engaging or positive engaging shift elements.

In one embodiment of the aforementioned device, it is possible to arrange, by planetary gear sets, one of the shift elements radially inside the chain gear arranged coaxially to the drive shaft, in order to further reduce the axial design length of the transmission, wherein said shift element is preferably a frictional engaging shift element.

The electric motor is arranged preferably coaxially to the drive shaft. In this case, the electric motor occupies, for example, the installation space provided for the torque converter in a conventional automatic transmission. In particular, given a high nominal torque of the electric motor, the axial design length of the electric motor may, however, significantly exceed the axial design length of a standard torque converter.

As an alternative, the electric motor may be arranged paraxially to the drive shaft. The constant operative connection between the drive shaft and the rotor of the electric motor has to be bridged by a suitable transmission, for example, by a spur gear set or by a chain drive. Owing to this axial offset the design space conflict between the electric motor, the downstream gear set and the differential transmission is easier to resolve, because the electric motor and the differential transmission can be arranged at various angular positions about the axis of the drive shaft. However, the design space available in the motor vehicle is limited by other components, so that it is still possible for there to be a conflict in terms of the design space. In such an axially offset arrangement of the electric motor the aforementioned measures increase the flexibility of the arrangement, so that the design space conflict is avoidable.

Preferably the electric motor is arranged axially closer to the interface of the transmission to the transmission-external drive unit than the chain drive. In other words, the axial distance between the chain drive and this interface is greater than the axial distance between the electric motor and the same interface.

The invention also relates to a hybrid drive train for a motor vehicle with a transmission, as described above. The hybrid drive train includes not only the transmission, but also an internal combustion engine, which is connected or is connectable to the drive shaft of the transmission in a rotationally elastic manner by at least one torsional vibration damper. Between the drive shaft and the internal combustion engine there may be a disconnect clutch, which may be a constituent part of the transmission. The output shafts of the differential transmission are connected to the driving gears of the motor vehicle. The hybrid drive train enables a plurality of driving modes of the motor vehicle. In an electric driving mode the motor vehicle is driven by the electric motor of the transmission. In an internal combustion engine mode the motor vehicle is driven by the internal combustion engine. In a hybrid mode the motor vehicle is driven by both the internal combustion engine and also by the electric motor of the transmission.

A connection between two elements that always exists is referred to as a permanent connection. Such permanently connected elements always rotate with the same dependence between their rotational speeds. In a permanent connection between two elements there may not be a shift element. Therefore, a permanent connection has to be distinguished from a shiftable connection. A connection between two elements that always exists is referred to as a permanently rotationally fixed connection; and, hence, its connected elements always have the same rotational speed.

Both the features specified in the patent claims and the features specified in the following exemplary embodiment of the transmission according to the system are suitable, in each case individually, or in any desired combination with one another, for refining the subject matter according to the invention.

Further advantages and advantageous embodiments of the transmission according to the invention will emerge from the patent claims and from the exemplary embodiments described in principle below with reference to the drawings.

BRIEF DESCRIPTION OF THE DRAWINGS

The invention is described more specifically by example on the basis of the attached figures. The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
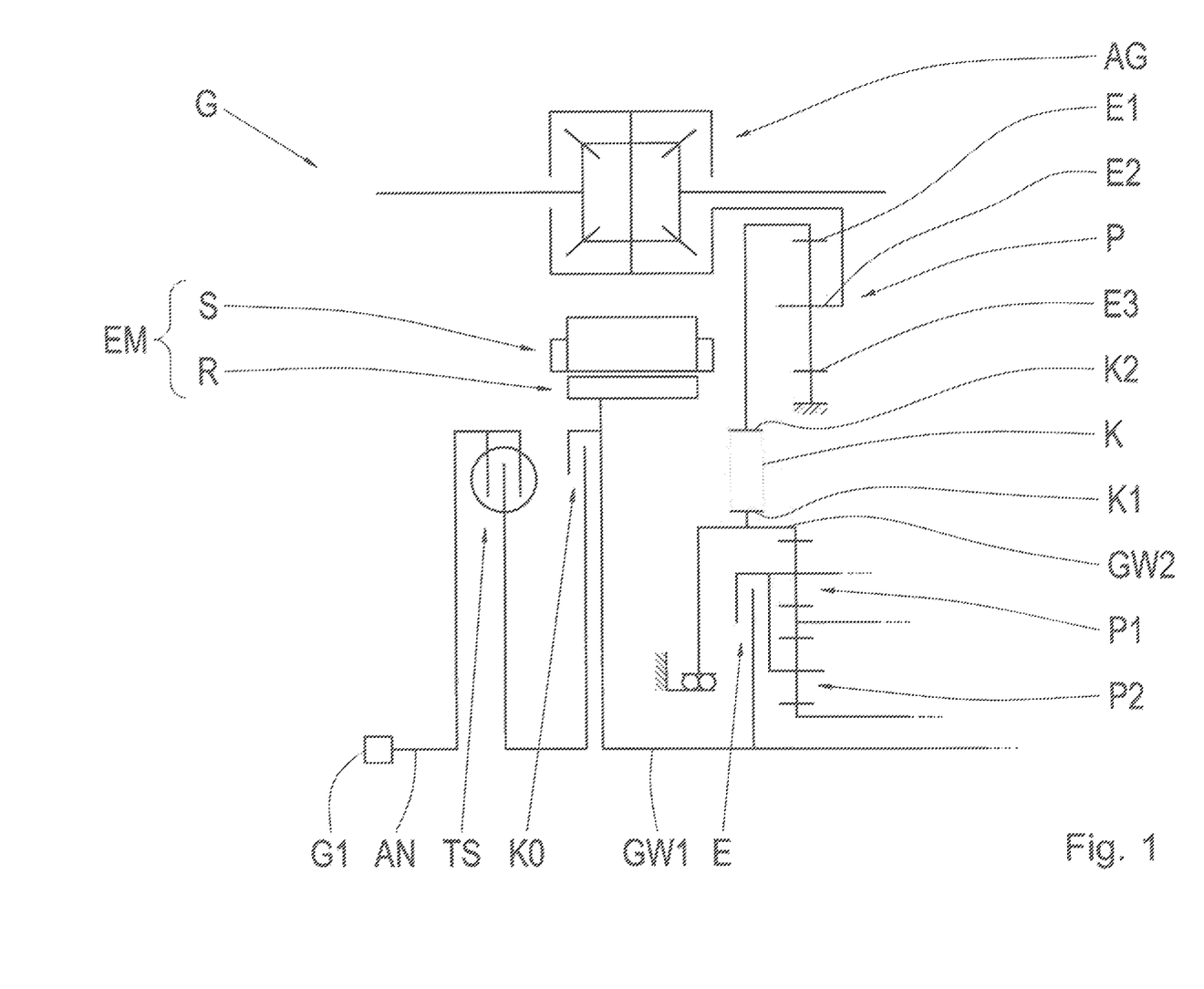
FIGS. 1-4 show schematic views of various embodiments of the transmission according to the invention.

FIG. 1 shows a schematic form of a transmission G in accordance with a first exemplary embodiment. The transmission G includes a drive shaft GW1, an output shaft GW2, an electric motor EM with a rotationally fixed stator S and a rotatable rotor R, and a differential transmission AG. The rotor R is permanently connected to the drive shaft GW1. The differential transmission AG is permanently connected to the output shaft GW2 by a chain drive K and by a downstream gear set P arranged coaxially to the differential transmission AG. The chain drive K includes not only the chain, but also a chain gear K1 and a chain gear K2. The chain gear K1 is permanently connected to the output shaft GW2. The chain gear K2 is permanently connected to a sun gear E1 of the downstream gear set P.

The downstream gear set P is a negative or minus gear set. A negative or minus gear set denotes a planetary gear set comprising a planet carrier, at which the planetary gears are rotatably mounted, comprising a sun gear and comprising a ring gear, where the gear teeth of at least one of the planetary gears mesh with both the gear teeth of the sun gear and also with the gear teeth of the ring gear, so that the ring gear and the sun gear rotate in opposite directions of rotation when the sun gear rotates and the planet carrier is stationary. Only half of the downstream gear set P is shown. A ring gear E3 of the downstream gear set P is permanently fixed in a rotationally fixed manner. A sun gear E1 of the downstream gear set P is permanently connected to the cage of the differential transmission AG.

FIG. 1 shows a device for forming various gear ratios between the drive shaft GW1 and the output shaft GW2 by a first planetary gear set P1, a second planetary gear set P2, and by a non-positive engaging shift element E. The representation of this device that is selected in FIG. 1 should be regarded solely as an example. Instead of the two planetary gear sets P1, P2, it would also be possible to use a layshaft transmission or a planetary gear unit that is constructed in another suitable way.

Furthermore, the transmission G includes an interface G1 to a transmission-external drive unit not shown in FIG. 1.

The interface G1 is formed, by way of example, at a connecting shaft AN, in which a torsional vibration damper TS is arranged. The connecting shaft AN is connectable to the drive shaft GW1 by a disconnect clutch K0 arranged radially inside the rotor. The torsional vibration damper TS could also be arranged radially inside the rotor R.

The chain drive K is arranged axially between the differential transmission AG and the downstream gear set P. In this case, the differential transmission AG is arranged axially at the same level as the electric motor EM. When the torsional vibration damper TS is arranged radially inside the rotor R, it is possible to provide an extremely compact design in the axial direction, so that the differential transmission AG is arranged at the axial end of the transmission G at which the interface G1 is formed. The axial distance of the chain drive K from the interface G1 is greater than the axial distance of the electric motor EM from the interface G1.

Figure 2:
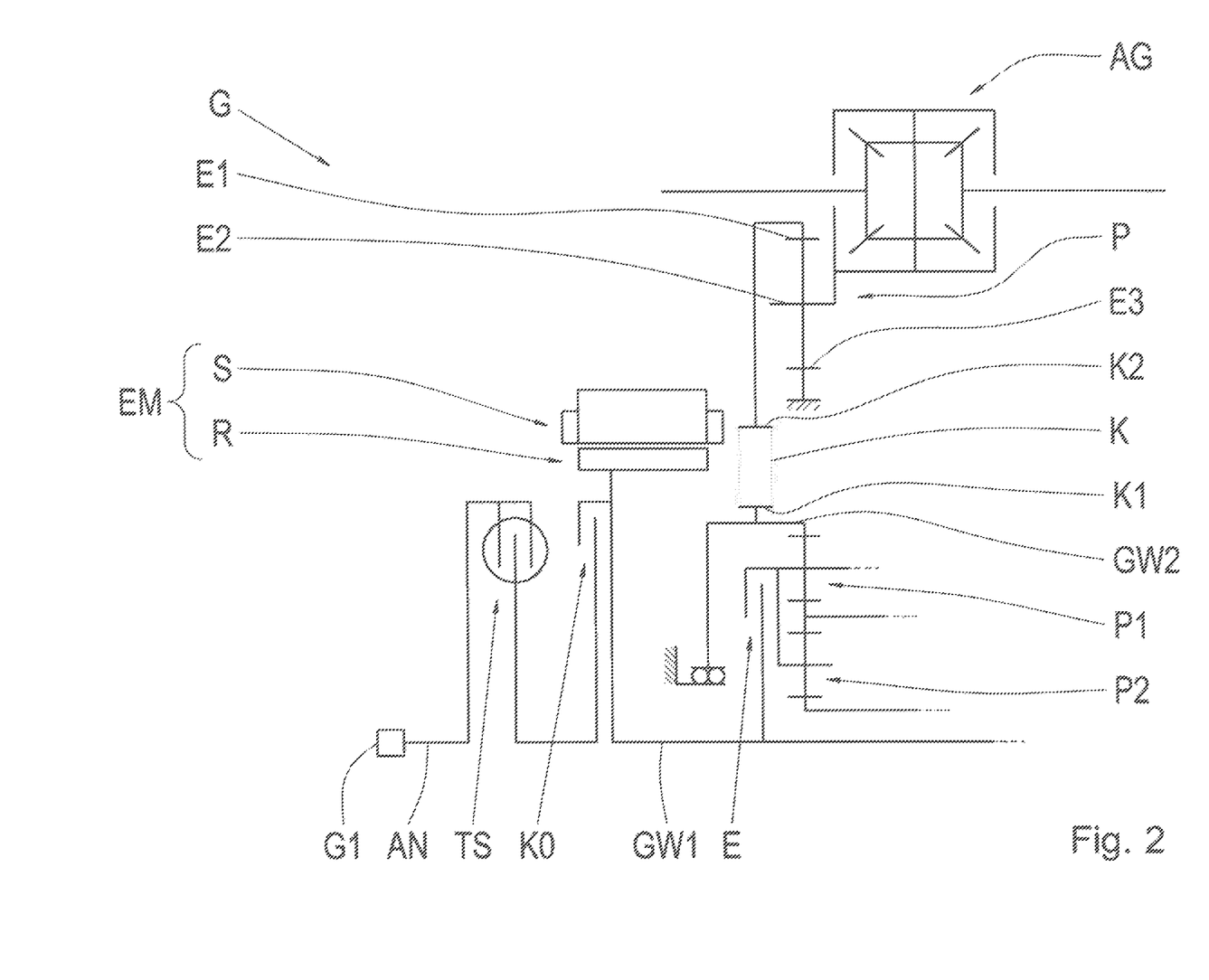

FIG. 2 shows a schematic form of a transmission G in accordance with a second exemplary embodiment, which essentially corresponds to the first exemplary embodiment shown in FIG. 1. Only the position of the differential transmission AG was changed, so that the differential transmission AG is now arranged axially behind the downstream gear set P. The downstream gear set P is now arranged axially between the differential transmission AG and the chain drive K.

Figure 3:
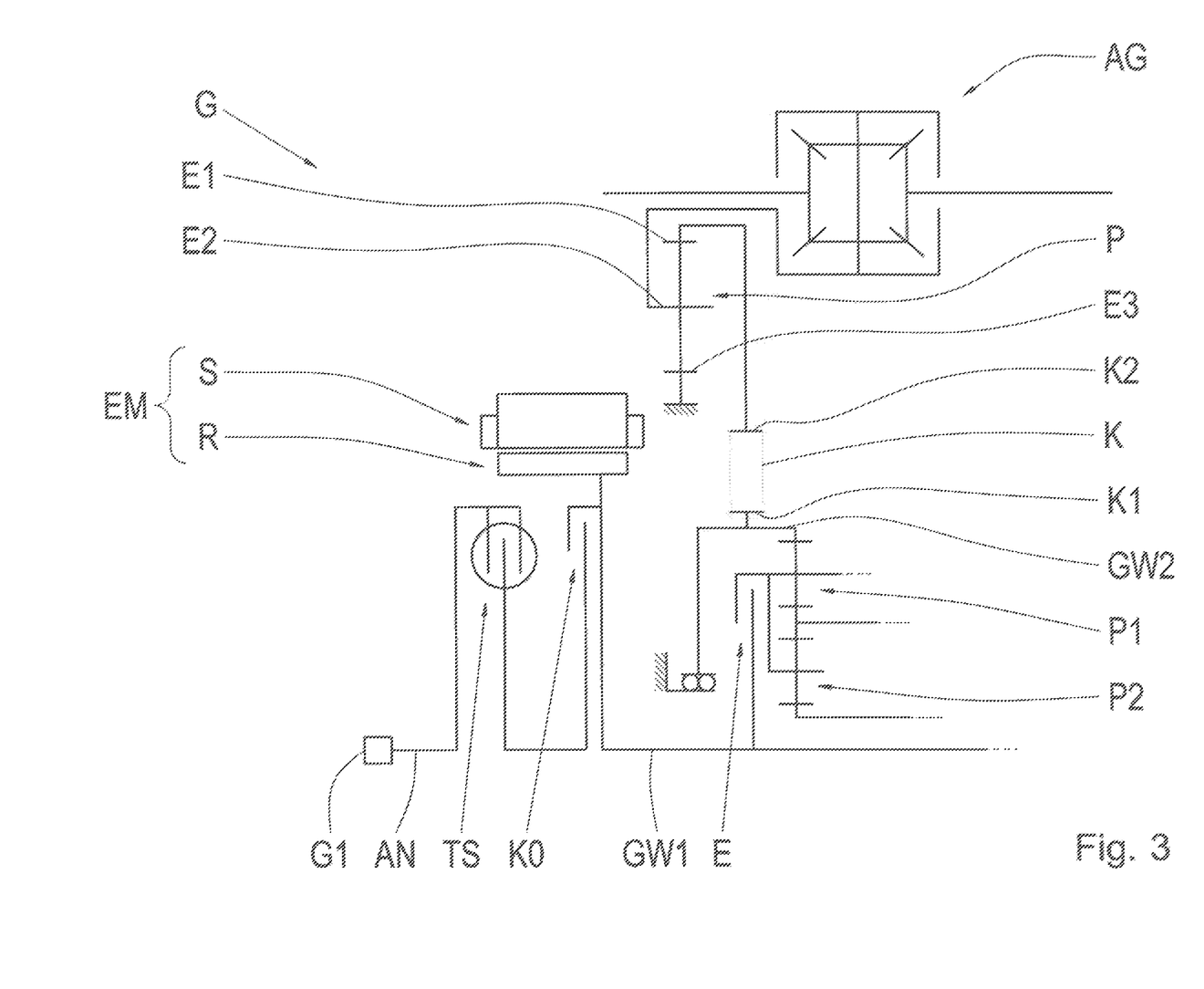

FIG. 3 shows a schematic form of a transmission G in accordance with a third exemplary embodiment, which essentially corresponds to the second exemplary embodiment shown in FIG. 2. Only the arrangement of the downstream gear set P and the chain drive K was changed, so that the chain drive K is now arranged axially between the downstream gear set P and the differential transmission AG. The axial distance between the chain drive K and the interface G1 is greater than the axial distance between the electric motor EM and the interface G1.

Figure 4:
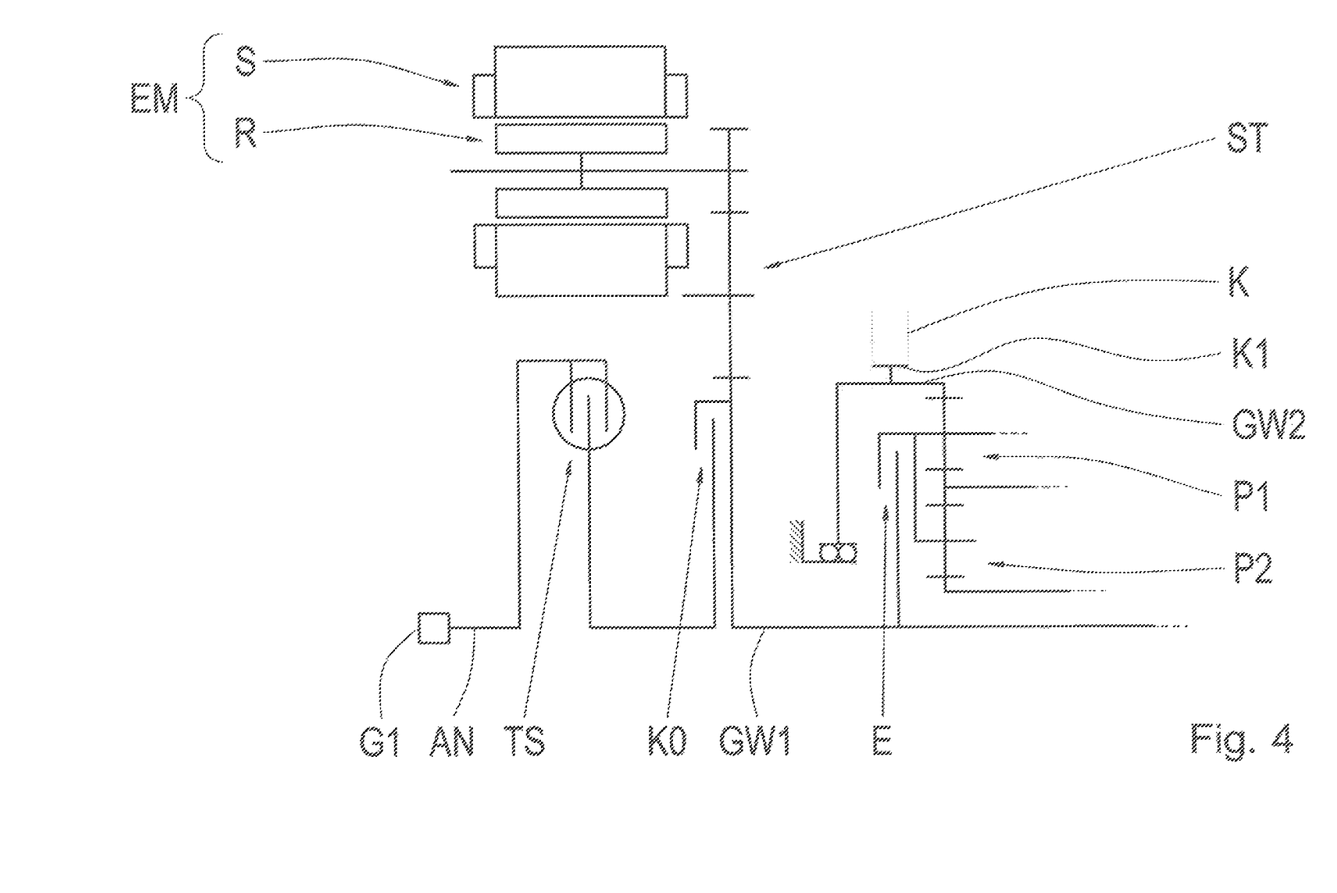

FIG. 4 shows a schematic form of a transmission G in accordance with a fourth exemplary embodiment, which essentially corresponds to the first exemplary embodiment shown in FIG. 1. The electric motor EM is now arranged not coaxially, but paraxially to the drive shaft GW1. The attachment of the rotor R to the drive shaft GW1 is carried out by a spur gear set ST. The differential transmission AG and the downstream gear set P, which is arranged coaxially to said differential transmission, are arranged in a different sectional plane and are, therefore, not shown in FIG. 4.

Figure 5:
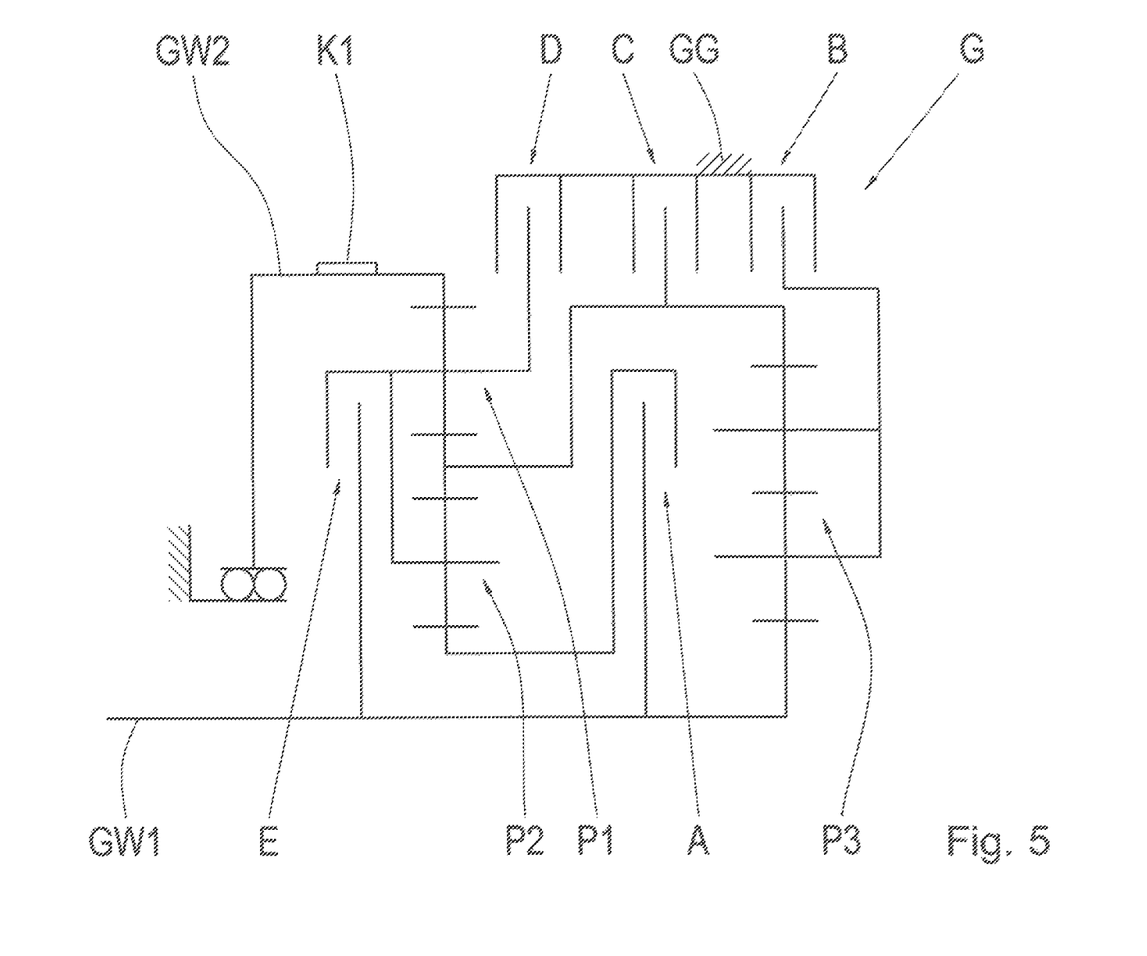
FIG. 5 shows an exemplary transmission gear set for a transmission according to the invention.

FIG. 5 shows, by way of example, a device for forming various gear ratios between the drive shaft GW1 and the output shaft GW2. The transmission G includes not only the first and second planetary gear sets P1, which are negative or minus gear sets, but also a third planetary gear set P3, which is a plus gear set. The difference between a plus gear set and a negative or minus planetary gear set is that the plus gear set includes inner and outer planetary gears, which are mounted rotatably on the planet carrier. In this case, the gear teeth of the inner planetary gears mesh, on the one hand, with the gear teeth of the sun gear and, on the other hand, with the gear teeth of the outer planetary gears. In addition, the gear teeth of the outer planetary gears mesh with the gear teeth of the ring gear. The result is that when the planet carrier is stationary, the ring gear and the sun gear rotate in the same direction of rotation.

The drive shaft GW1 is permanently connected to a sun gear of the third planetary gear set P3. The output shaft GW2 is permanently connected to a ring gear of the first planetary gear set P1. A ring gear of the second planetary gear set P2 is permanently connected to a sun gear of the first planetary gear set P1 and to a ring gear of the third planetary gear set P3. A planet carrier of the first planetary gear set P1 is permanently connected to a planet carrier of the second planetary gear set P2. By engaging a first shift element A, the drive shaft GW1 is connectable to a sun gear of the second planetary gear set P2. By engaging a second shift element B, a planet carrier of the third planetary gear set P3 is fixable in a rotationally fixed manner. By engaging a third shift element C, the sun gear of the first planetary gear set P1 is fixable with respect to a rotationally fixed component GG in a rotationally fixed manner. By engaging a fourth shift element D, the planet carrier of the second planetary gear set P2 is fixable in a rotationally fixed manner. By engaging a fifth shift element E, the drive shaft GW1 is connectable to the planet carrier of the second planetary gear set P2. In this context the fifth shift element E is arranged radially inside the chain gear K1.

Figure 6:
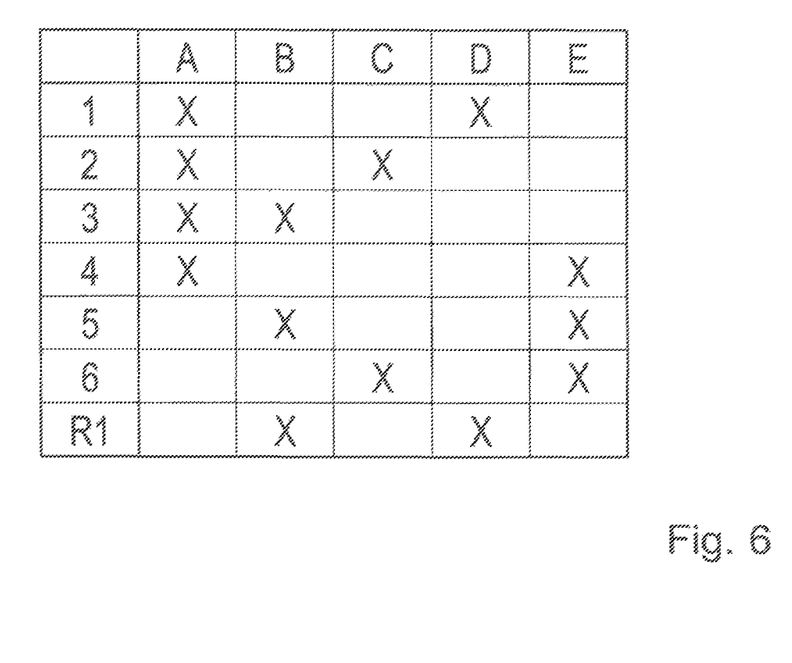
FIG. 6 shows an engagement sequence diagram for the transmission gear set.

FIG. 6 shows an engagement sequence diagram for the gear set shown in FIG. 5. The transmission G is configured to form six forward gears 1 to 6 as well as a reverse gear R1 between the drive shaft GW1 and the output shaft GW2. The engagement sequence diagram indicates with an X which shift elements A to E are to be engaged in each of the gears 1 to 6, R1. The first forward gear 1 is produced by engaging the first shift element A and the fourth shift element D. The second forward gear 2 is produced by engaging the first shift element A and the third shift element C. The third forward gear 3 is produced by engaging the first shift element A and the second shift element B. The fourth forward gear 4 is produced by engaging the first shift element A and the fifth shift element E. The fifth forward gear 5 is produced by engaging the second shift element B and the fifth shift element E. The sixth forward gear 6 is produced by engaging the third shift element C and the fifth shift element E. The reverse gear R1 is produced by engaging the second shift element B and the fourth shift element D.

Figure 7:
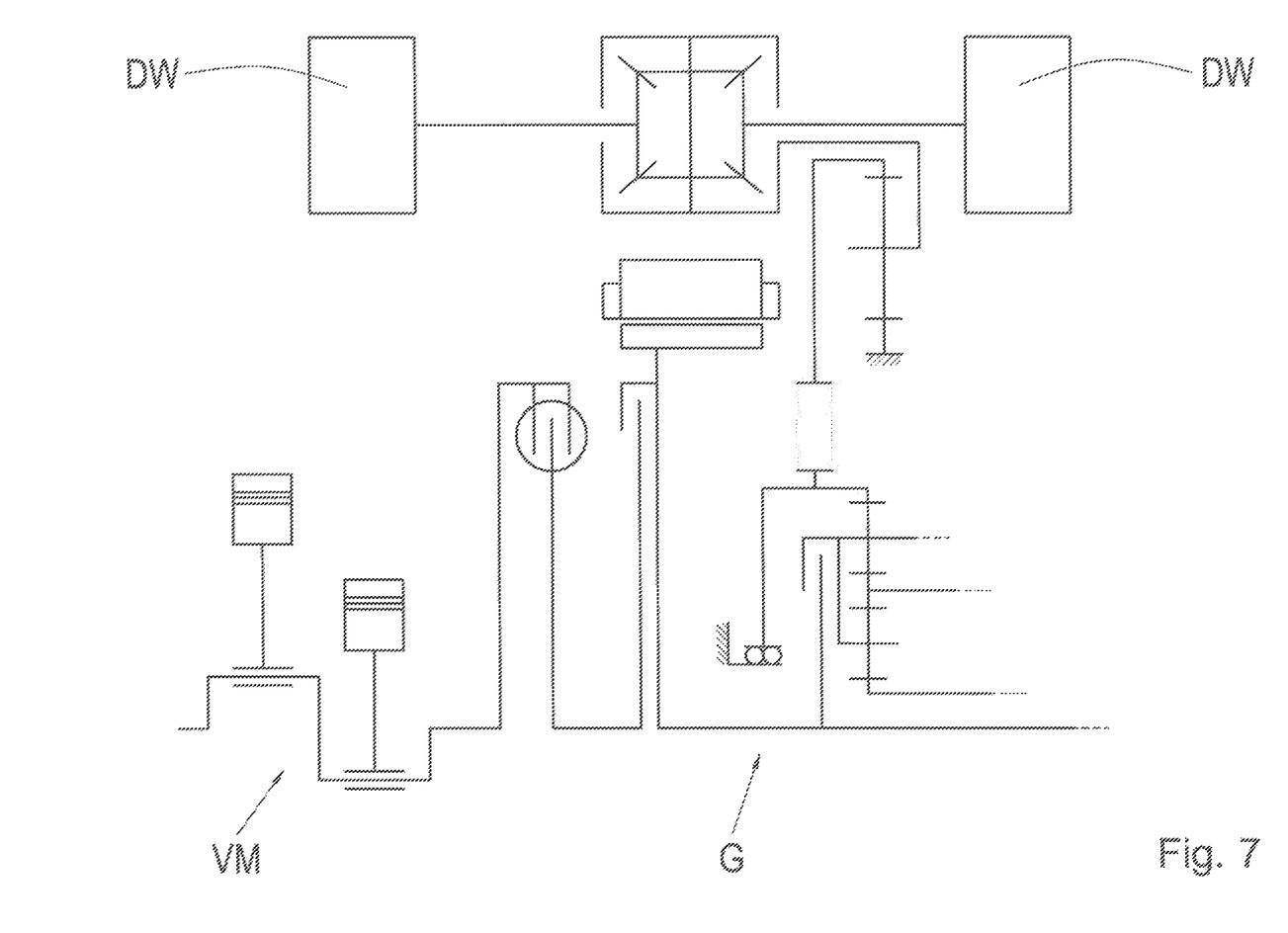
FIG. 7 shows a hybrid drive train for a motor vehicle.

FIG. 7 shows a schematic form of a hybrid drive train for a motor vehicle. An internal combustion engine VM is connected to the connecting shaft AN of the transmission G. The transmission G, shown in FIG. 7, corresponds to the first exemplary embodiment of the invention shown in FIG. 1. This is to be regarded solely as an example. The internal combustion engine VM could also be connected directly to the drive shaft GW1 of the transmission G by the torsional vibration damper TS. The drive train could be carried out with any one of the concrete exemplary embodiments. The person skilled in the art will freely configure the arrangement and spatial position of the individual components of the drive train as a function of the external boundary conditions. The power, applied to the output shaft GW2, is distributed through the differential transmission AG to the driving gears DW of the motor vehicle.

Modifications and variations can be made to the embodiments illustrated or described herein without departing from the scope and spirit of the invention as set forth in the appended claims.

LIST OF REFERENCE NUMERALS AND CHARACTERS

G transmission
GG rotationally fixed component
G1 interface
GW1 drive shaft
GW2 output shaft
AG differential transmission EM electric motor
S stator
R rotor
K chain drive
K1 chain gear
K2 chain gear
P downstream gear set
E1 sun gear
E2 planet carrier
E3 ring gear
AN connecting shaft
KO disconnect clutch
TS torsional vibration damper
P1 first planetary gear set
P2 second planetary gear set
P3 third planetary gear set
A first shift element
B second shift element
C third shift element
D fourth shift element
E fifth shift element
ST spur gear set
1 to 6 first to sixth forward gears
R1 reverse gear
VM internal combustion engine
DW driving gear

The invention claimed is:

1. A transmission (G) for a motor vehicle, the transmission (G) comprising:
an interface (G1) to a transmission-external drive unit (VM);
a drive shaft (GW1);
an output shaft (GW2) coaxial to the drive shaft (GW1);
a differential transmission (AG) paraxial to the drive shaft (GW1);
a device for forming various gear ratios between the drive shaft (GW1) and the output shaft (GW2); and
an electric motor (EM) with a rotationally fixed stator (S) and a rotatable rotor (R),
wherein the output shaft (GW2) is in constant operative connection with the differential transmission (AG) by a chain drive (K) and a downstream gear set (P) coaxial to the differential transmission (AG),
wherein the electric motor (EM) is at an axial end of the transmission (G) at which the interface (G1) to the transmission-external drive unit (VM) is formed,
wherein the rotor (R) is in constant operative connection with the drive shaft (GW1), and
wherein the chain drive (K) is axially between the differential transmission (AG) and the downstream gear set (P).

2. The transmission (G) of claim 1, wherein the differential transmission (AG) is arranged at an end of the transmission (G) at which the interface (G1) to the transmission-external drive unit (VM) formed.

3. The transmission (G) of claim 1, wherein the downstream gear set (P) is axially between the electric motor (EM) and the chain drive (K).

4. The transmission (G) of claim 1, wherein the downstream gear set (P) is a negative planetary gear set having a ring gear (E3) permanently fixed in a rotationally fixed manner, a sun gear (E1) permanently connected to a chain gear (K2) of the chain drive (K) that is coaxial to the differential transmission (AG), and a planet carrier (E2) permanently connected to the differential transmission (AG).

5. The transmission (G) of claim 4, wherein the device for forming the various gear ratios between the drive shaft (GW1) and the output shaft (GW2) comprises a plurality of planetary gear sets (P1, P2, P3) and a plurality of shift elements (A, B, C, D, E), wherein one of the plurality of shift elements (E) is at least partially radially inside a chain gear (K1) of the chain drive (K) that is coaxial to the drive shaft (GW1).

6. The transmission (G) of claim 1, wherein the electric motor (EM) is coaxial to the drive shaft (GW1).

7. The transmission (G) of claim 1, wherein the electric motor (EM) is paraxial to the drive shaft (GW1).

8. The transmission (G) of claim 1, wherein an axial distance between the chain drive (K) and the interface (G1) is greater than an axial distance between the electric motor (EM) and the interface (G1).

9. A hybrid drive train for a motor vehicle with the transmission (G) of claim 1.

10. A transmission (G) for a motor vehicle, wherein the transmission (G) comprises:
an interface (G1) to a transmission-external drive unit (VM);
a drive shaft (GW1);
an output shaft (GW2) coaxial to the drive shaft (GW1);
a differential transmission (AG) paraxial to the drive shaft (GW1);
a device for forming various gear ratios between the drive shaft (GW1) and the output shaft (GW2); and
an electric motor (EM) with a rotationally fixed stator (S) and a rotatable rotor (R),
wherein the output shaft (GW2) is in constant operative connection with the differential transmission (AG) by a chain drive (K) and a downstream gear set (P) coaxial to the differential transmission (AG),
wherein the electric motor (EM) is at an axial end of the transmission (G) at which the interface (G1) to the transmission-external drive unit (VM) is formed,
wherein the rotor (R) is in constant operative connection with the drive shaft (GW1), and
wherein the downstream gear set (P) is axially between the chain drive (K) and the differential transmission (AG), and the chain drive (K) is axially between the electric motor (EM) and the downstream gear set (P).

11. The transmission (G) of claim 10, wherein the downstream gear set (P) is a negative planetary gear set having a ring gear (E3) permanently fixed in a rotationally fixed manner, a sun gear (E1) permanently connected to a chain gear (K2) of the chain drive (K) that is coaxial to the differential transmission (AG), and a planet carrier (E2) permanently connected to the differential transmission (AG).

12. The transmission (G) of claim 11, wherein the device for forming the various gear ratios between the drive shaft (GW1) and the output shaft (GW2) comprises a plurality of planetary gear sets (P1, P2, P3) as well as a plurality of shift elements (A, B, C, D, E), wherein one of the plurality of shift elements (E) is at least partially radially inside a chain gear (K1) of the chain drive (K) that is coaxial to the drive shaft (GW1).

13. The transmission (G) of claim 10, wherein the electric motor (EM) is coaxial to the drive shaft (GW1).

14. The transmission (G) of claim 10, wherein the electric motor (EM) is paraxial to the drive shaft (GW1).

15. The transmission (G) of claim 10, wherein an axial distance between the chain drive (K) and the interface (G1) is greater than an axial distance between the electric motor (EM) and the interface (G1).

16. A hybrid drive train for a motor vehicle with the transmission (G) of claim 10.

\* \* \* \* \*